United States Patent [19]

Williams

[11] 3,807,226

[45] Apr. 30, 1974

[54] NON-LINEAR AMPLIFICATION TECHNIQUE FOR IMPROVING SIGNAL TO NOISE CONTRAST

[75] Inventor: Nathaniel S. Williams, Washington, D.C.

[73] Assignee: The United States of America as represented by the Secretary of the Department of Transportation, Washington, D.C.

[22] Filed: Nov. 29, 1972

[21] Appl. No.: 310,340

[52] U.S. Cl.................. 73/146, 73/355 R, 250/338
[51] Int. Cl. .......................................... G01m 17/02
[58] Field of Search........... 73/146, 355 R; 250/242, 250/360, 338, 450; 340/227 R

[56] References Cited
UNITED STATES PATENTS 2,272,893   2/1942   Bosomworth...................... 250/450
2,301,251   11/1942   Capen.................................. 250/360

*Primary Examiner*—Donald D. Woodiel
*Attorney, Agent, or Firm*—Herbert E. Farmer; Nathan Edelberg; Harold P. Deeley

[57] ABSTRACT

Disclosed is a dynamic tire testing apparatus with an infrared sensor disposed near a rotating, loaded tire and an alarm apparatus that indicates the presence of a predetermined level of infrared emissions from the tire indicating faults therein. Included in the alarm apparatus is a non-linear amplifier that provides one level of amplification for values of signals below a predetermined minimum amplitude level and a second, higher level of amplification for signals in excess of the predetermined minimum level. Signal to noise contrast is improved by proper selection of the minimum level. The tire load can be provided from a road to a tire mounted on a moving automobile or by a pressure roller to a tire mounted on a test bench. Also included is a keying apparatus to track the angular position of the tire under test and a monitor that is responsive to both the keying apparatus and the alarm to indicate the location of faults in the tire under test. The non-linear amplifier disclosed herein is also useful in conjunction with other radiation detectors that are sensitive to, for example, microwaves, ultrasonics, etc.

9 Claims, 3 Drawing Figures

PATENTED APR 30 1974 3,807,226

NON-LINEAR AMPLIFICATION TECHNIQUE FOR IMPROVING SIGNAL TO NOISE CONTRAST

ORIGIN OF THE INVENTION

The invention described herein was made by an employee of the United States Government and may be manufactured and used by or for the Government for governmental purposes without the payment of any royalties thereon or therefor.

BACKGROUND OF THE INVENTION

This invention relates to tire testing apparatus and more particularly to dynamic tire testing apparatus for locating faults within a tire that is rotating under an actual or a simulated load.

Predicting tire failure before the fact is becoming more important as both automobile driving speeds and highway congestion increase. Non-destructive tire tests utilizing X-ray or ultrasonic techniques are known, but they have not proven completely satisfactory. Drawbacks include the cost of the equipment involved and the fact that tests are necessarily static. Thus the known tests are not practical in conjunction with a tire mounted on a moving automobile and cannot detect tire faults that occur only after use. Obviously, a tester that could continuously check for tire faults on a moving vehicle would prevent many serious accidents.

Hysteresis effects generate heat in a tire when it is driven under a deforming load. Under these conditions the presence of certain forms of defects in the structure of the tire produce additional localized sources of heat. Since hot bodies emit infrared radiation, the presence of these defects could, in principle, be detected by emission of excess amounts of infrared radiation in the vicinity of the defects. Unfortunately, tire rubber is particularly opaque to the short wavelength infrared radiation involved so that the defects can only be detected by excess radiation emitted from areas of the surface of the tire that are heated by thermal diffusion from the defect sources. Since the diffusion process heats a relatively large surface area of the tire, the surface temperature rise due to the defect is small. In addition, rotation of the tire in air produces a temperature differential between the outer, exposed surface of the tread and the hotter, more sheltered areas in the grooves of the tire, and yet other temperature differentials between the ribs and the slits therein.

The infrared signal detected by a suitable stationary detector mounted near the tire will therefore fluctuate in a manner that depends on the above described temperature differentials and on the tread pattern. These fluctuations limit the smallest defect signals that can be detected inasmuch as they reduce the signal to noise contrast. Consequently, conventional infrared detectors are unable to accurately distinguish between defect signals and fluctuations due to tread pattern.

An object of this invention, therefore, is to provide a tire testing apparatus that is inexpensive and accurate and can perform dynamic infrared tire tests. It is a further object that the test apparatus be usable in a permanent test bench installation or mounted on a vehicle to continuously monitor tires in use.

SUMMARY OF THE INVENTION

This invention is characterized by a tire testing apparatus including an infrared sensor disposed near the tread of a tire being rotated under a deforming load, as for example, on an automobile. A signal apparatus receives the sensor output and provides an alarm signal in response to excessive amounts of infrared radiation indicating a localized defect or fault in the tire. However, as mentioned previously, the signal to noise contrast of the sensor output signal is very low. Consequently, a non-linear amplifier is included within the signal apparatus. The amplifier provides a low level of amplification for signal values below a minimum amplitude and a second, higher level of amplification for signal values exceeding the minimum amplitude. A zener coupling diode that passes signals exceeding a critical level and inhibits signals below the critical level determines minimum amplitude to which the amplifier is sensitive and is selected so that the mimimum amplitude is slightly greater than the anticipated peak noise signal from the detector. Thus noise signals receive low level amplification while even a small defect signal produces a signal component that exceeds the minimum amplitude and accordingly is subjected to a much higher level of amplification. In this way a significant enhancement of signal to noise contrast is obtained making possible the accurate detection of faults. It should be noted that this method of improving signal to noise contrast is also useful in conjunction with other types of detectors, as for example, microwave or ultrasonic detectors.

A feature of this invention is the inclusion of an adjustable bias circuit for the zener diode in the non-linear amplifier so that the critical level, and thus the minimum amplitude to which the amplifier is sensitive, can be adjusted. This is advantageous inasmuch as a tire operated under a deforming load reaches a substantially steady state temperature but under different circumstances that steady state temperature may be different. For example, considering a tire testing apparatus mounted on an automobile and thus utilized in conjunction with tires under normal road use, it is apparent that the steady state temperature of the tire will be substantially higher during the summer than during the winter. The adjustable bias apparatus facilitates changing the minimum amplitude as conditions change and thus insures maximum sensitivity of the testing apparatus under all conditions.

Another embodiment of the apparatus includes a large pressure roller that simulates road use for a bench mounted test apparatus. The roller is independently driven so that rotatably mounted tires pressed thereagainst experience conditions similar to those experienced by a front tire on an automobile. Thus inexpensive bench testing of tires before use is possible under carefully controlled temperature conditions. Such pretesting is convenient for determining inherent flaws in tires prior to their use.

A feature of the bench testing embodiment is the inclusion of a keying apparatus to track the angular position of the tire under test and a monitor that is responsive to the keying apparatus and the alarm signal and indicates the location of any detected faults in the tire. The keying apparatus comprises a strip of aluminum foil affixed to the side wall of the tire and a photoresponsive diode to record each passage of the foil and the monitor can be, for example, an oscilloscope with the photoresponsive diode connected to the sync input. Thus, a new oscilloscope trace is started with each passage of the aluminum foil by the photoresponsive diode and the location of the alarm signal with respect to the total length of the oscilloscope trace locates the associated fault on the tire with respect to the foil strip and the circumference. The ability to locate faults and thus examine them is useful to persons involved in the research and development of tires.

DESCRIPTION OF THE DRAWINGS

These and other features and objects of the present invention will become more apparent upon a perusal of the following description taken in conjunction with the accompanying drawings wherein.

DESCRIPTION OF THE PREFERRED EMBODIMENTS

Figure 1:
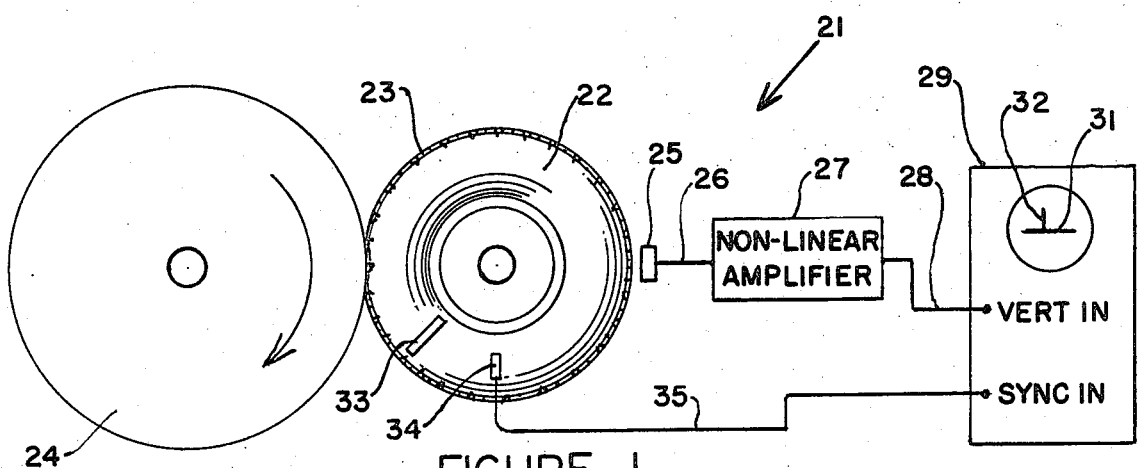
FIG. 1 is a schematic illustration of a tire test apparatus.

Referring first to FIG. 1 there is shown a bench mounted tire test apparatus 21 including a tire 22 under test. The tire 22 is rotatably mounted with a tread 23 thereof contacting a large pressure roller 24 that is driven by a motor (not shown) so as to simulate road usage of the tire. The force applied is sufficient to deform and cause wear of the tread 23. Disposed near the tread 23 of the tire 22 is an infrared sensor 25 that detects infrared energy radiating from the tread and supplies an output signal on a line 26 in response thereto. Depending upon the test accuracy desired, the sensor 25 can be sensitive to a relatively small, for example, 0.25 inch by 0.25 inch area, or a relatively large area, and it can be stationary or reciprocatively mounted so as to facilitate scanning of the tread. The output signal on the line 26 is received by a non-linear amplifier 26 that provides one level of amplification for values of the output signal below a minimum amplitude and a second, higher level of amplification for values or portions of the output signal exceeding the minimum amplitude. The non-linear amplifier 27 provides an alarm signal on a line 28 in response to predetermined infrared radiation characteristics as indicated by the output signal. A monitor oscilloscope 29 receives the alarm signal and provides a trace 31 with a peak 32, the significance of which will be explained below. Affixed to a side wall of the tire 22 is a strip of aluminum foil 33 that passes beneath a photodetector 34 during each revolution of the tire. A keying line 35 connects the photodetector 34 output to the sync input of the oscilloscope 29. Thus, a new trace is begun by the oscilloscope 29 each time the foil strip 33 passes the photodetector 34.

Figure 2:
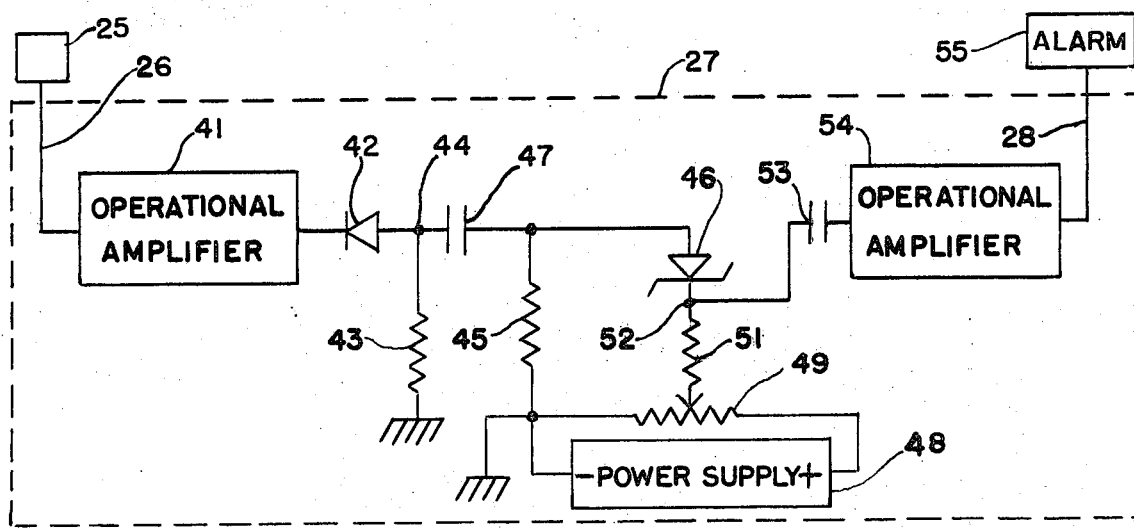
FIG. 2 is a schematic diagram of a non-linear amplifier utilized in the test apparatus shown in FIG. 1.

Referring now to FIG. 2 there is shown a schematic diagram of the non-linear amplifier 27. The output signal on the line 26 is delivered to an operational amplifier 41 that amplifies and inverts the signal so that positive values thereof become negative values and therefore are passed by a diode 42 and a resistor 43 to produce negative signals at a junction 44. The output signal is an a.c. signal and negative half cycles thereof appear at the junction 44 and are then passed to a bias resistor 45 and a zener coupling diode 46 by a capacitor 47. A power supply 48 and an adjustable bias resistor 49 back bias the zener diode 46 near its breakdown potential. It will be noted that the negative pulses delivered to the zener coupling diode 46 in response to positive excursions on the line 26 further back bias the diode. If a large enough positive pulse is delivered on the line 26, the negative pulse delivered to the diode 46 will be sufficient to cause breakdown and resulting reverse conduction through the diode 46 and a resistor 51 producing a corresponding negative pulse at a junction 52. The critical level at the junction 44 that is required to cause breakdown of the diode 46 is dependent on the setting of the variable bias resistor 49 and thus the minimum amplitude required on the line 26 is so dependent. When the diode 46 conducts, the negative pulse produced at the junction 52 is passed by a capacitor 53 to a second operational amplifier 54 and therein amplified and inverted, providing a positive alarm signal on the line 28. As shown in FIG. 2, the line 28 is connected to an audio alarm 55 rather than the oscilloscope 29, either or both of which may be used as explained below.

Figure 3:
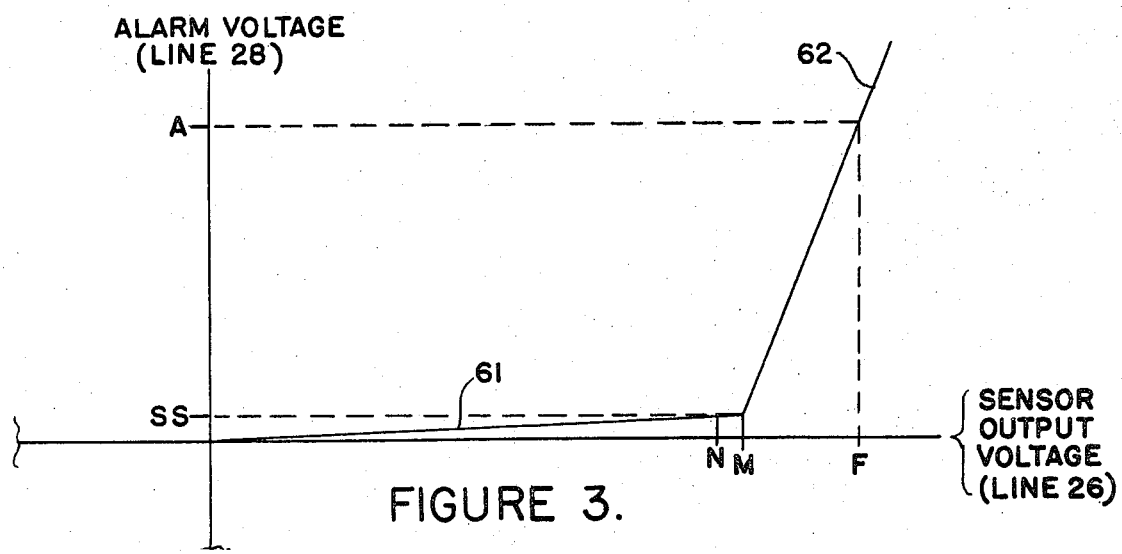
FIG. 3 is a diagram illustrating the voltage transfer characteristics of the amplifier depicted in FIG. 2.

Referring now to FIG. 3 there are shown the voltage transfer characteristics of the non-linear amplifier 27. The sensor output is shown on the abscissa and the alarm signal is shown on the ordinate. For negative voltages on the line 26 the output of the operational amplifier 41 is positive and thus is blocked by the diode 42 and the alarm voltage is zero. As the sensor output becomes more and more positive, but remains less than the minimum amplitude (depicted by point M in FIG. 3) of the non-linear amplifier 27, the alarm voltage on the line 28 increases slowly as shown by a low amplification curve 61. This increase is due only to reverse leakage current through the zener diode 46. If a positive voltage with an amplitude greater than the minimum amplitude M is delivered on the line 26, the zener diode 46 breaks down and so much of the negative voltage thereon as exceeds the critical level is passed to the amplifier 54. Thus, when the sensor output exceeds the minimum amplitude M a portion thereof is freely passed by the zener diode 46 and amplified by the amplifier 54 and the gain of the non-linear amplifier 27 increases substantially as indicated by a steeper portion 62 of the response curve.

During operation of the tire testing apparatus 21 pressure roller 24 is rotated to drive the tire 22. Heat generated by hysteresis in response to the deformation of the tire 22 eventually produces an elevated, steady state temperature within the tire. Thus, infrared energy is emitted from the tread 23 and detected by the infrared sensor 25. As mentioned previously, the additional heat generated near faults in the tire 22 is widely diffused so that the temperature maxima produced thereby are small with respect to the variations due to the tread pattern and the slits in the ribs. Accordingly, the output signal on the line 26 has a low signal to noise contrast. This signal to noise contrast is improved by the non-linear amplifier 27 when the variable bias resistor 49 is set so that the minimum amplitude depicted by the point M in FIG. 3 is slightly greater than the peak amplitude value anticipated due to the noise signal as indicated by the point N. Under these conditions, the noise receives little amplification and the voltage on the line 28 is a low steady state value as indicated by the point SS in FIG. 3. However, when a fault in the tire 22 passes near the sensor 25 the average level of the signal on the line 26 increases slightly. Such a slight increase ordinarily would not be sufficient to trigger an alarm. However, the peaks in the higher average signal are now raised to the point F in FIG. 3, so that most of the voltage increase fails on the higher amplification portion 62 of the response curve. Thus, the alarm signal output, as indicated by the point A in FIG. 3, is substantially higher than the steady state output. The slight increase in the output signal on the line 26 therefore produces a substantial alarm signal on the line 28 and a resulting peak 32 on the oscilloscope 29. Since the oscilloscope trace 31 begins with the passage of the foil strip 33 below the photodetector 34, the position of the peak 32 with respect to the overall length of the trace 31 indicates proportionally the position of the fault with respect to the foil strip and the circumference of the tire 22. It will be obvious that the test apparatus 21 can be utilized to detect faults in the side walls of the tire 22 if the sensor 25 is mounted adjacent the side wall to be tested and the foil strip 33 is affixed to the opposite side wall. In addition it will be noted that the non-linear amplification technique disclosed is useful for other types of radiation detectors, for example, detectors responsive to microwave or ultrasonic radiation. The system disclosed is useful whenever an increase in signal to noise contrast is desired.

Referring now to FIG. 2 it is noted that the oscilloscope 29 is replaced with an audio alarm 55 that produces an audio signal when the alarm signal is present on the line 28. The system shown in FIG. 2, (i.e., without the pressure roller 24 or the oscilloscope 29) can be mounted directly in a motor vehicle with the radiation sensor 25 disposed near the tread of a tire and the alarm 55 near the operator. The driving force for the tire is then supplied by the vehicle and the road. In such an application the system of FIG. 2 can be utilized to continuously monitor the condition of the tires on a moving vehicle. A separate detector would be used for each tire to be monitored.

Obviously, many modifications and variations of the present invention are possible in light of the above teachings. For example, the zener diode 46 can be replaced with a standard diode with a lower dopant concentrate that provides the same reverse bias characteristics as a zener diode. It is to be understood, therefore, that the invention can be practiced otherwise than as specifically described.

What is claimed is:

1. Tire testing apparatus comprising:
motive means for rotating a tire under test to simulate road usage of the tire under a load;
radiation sensor means disposed near the tire under test for sensing thermal infrared radiation emanating therefrom and providing an output signal in response thereto; and
signal means for receiving said output signal and providing an alarm signal in response to predetermined characteristics thereof wherein said signal means comprises non-linear amplifier means for providing one level of amplification for values of said output signal below a minimum amplitude and a higher level of amplification for values of said output signal above said minimum amplitude so as to provide improved signal to noise contrast.

2. Apparatus according to claim 1 wherein said non-linear amplifier means comprises a zener coupling diode for passing signals exceeding a critical level.

3. Apparatus according to claim 1 wherein said non-linear amplifier means comprises adjustable bias means for selectively varying said critical level.

4. Apparatus according to claim 1 wherein said radiation sensor is disposed near the tread of the tire under test.

5. Apparatus according to claim 1 wherein said radiation sensor comprises an infrared sensor.

6. Apparatus according to claim 1 including pressure roller means for contacting the tread of the tire under test so as to induce wear thereof.

7. Apparatus according to claim 6 including keying means for providing a keying signal responsive to the angular position of the tire under test and monitoring means for indicating the location of hot-spots in the tire under test in response to said alarm and keying signals.

8. Apparatus according to claim 7 wherein said monitoring means comprises an oscilloscope.

9. Apparatus according to claim 8 wherein said keying means comprises a photoresponsive means for producing a pulse in response to each revolution of the tire under test.

* * * * *